United States Patent
Balasubramanyan et al.

(10) Patent No.: US 7,458,021 B2
(45) Date of Patent: Nov. 25, 2008

(54) SYSTEM AND METHOD FOR AUTHOR-DRIVEN TEMPLATE SWITCHING IN THE DEVELOPMENT AND MODIFICATION OF WEB PAGES

(75) Inventors: Balaji Balasubramanyan, Redmond, WA (US); Ryan Robert Stocker, Seattle, WA (US); William James Griffin, Sammamish, WA (US); Pat Miller, Sammamish, WA (US); Paula Cooper, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 11/021,099

(22) Filed: Dec. 23, 2004

(65) Prior Publication Data

US 2006/0143561 A1   Jun. 29, 2006

(51) Int. Cl.
   G06F 15/00   (2006.01)
   G06F 17/00   (2006.01)
(52) U.S. Cl. .................. 715/235; 715/236; 715/237; 715/243; 715/248
(58) Field of Classification Search ............ 715/513, 715/522, 517
   See application file for complete search history.

(56) References Cited

U.S. PATENT DOCUMENTS

| 5,860,073 | A | 1/1999 | Ferrel et al. |
| 6,230,173 | B1 | 5/2001 | Ferrel et al. |
| 6,584,480 | B1 | 6/2003 | Ferrel et al. |
| 7,146,565 | B2 * | 12/2006 | Toyama et al. ............... 715/513 |
| 7,155,491 | B1 * | 12/2006 | Schultz et al. ............... 709/217 |
| 2001/0011287 | A1 * | 8/2001 | Goto et al. .................. 707/513 |
| 2002/0138513 | A1 * | 9/2002 | Korotney et al. ............ 707/511 |
| 2003/0237046 | A1 * | 12/2003 | Parker et al. ................ 715/513 |
| 2004/0205592 | A1 * | 10/2004 | Huang ......................... 715/513 |
| 2004/0225652 | A1 * | 11/2004 | Duncan et al. ................ 707/4 |
| 2005/0102324 | A1 * | 5/2005 | Spring et al. ............. 707/104.1 |
| 2005/0108225 | A1 * | 5/2005 | Chau ............................. 707/3 |
| 2006/0087669 | A1 * | 4/2006 | Yamaguchi et al. ........ 358/1.13 |
| 2006/0200751 | A1 * | 9/2006 | Underwood et al. ..... 715/501.1 |

OTHER PUBLICATIONS

Altova, Stylevision 2004 User Manual, May 17, 2004, Altova, pp. 1,2,13-15,27-30,263, and 275-277.*

* cited by examiner

Primary Examiner—Doug Hutton
Assistant Examiner—N Hillery
(74) Attorney, Agent, or Firm—Shook, Hardy & Bacon, LLP.

(57) ABSTRACT

A system and method for authoring web pages that permits a user to select a schema for the web page and a template for visually rendering the web page. Once a web page has been visualized and published, a second template may be used to revisualize the web page without having to recreate the web page or any links pointing to the web page.

6 Claims, 4 Drawing Sheets

SYSTEM AND METHOD FOR AUTHOR-DRIVEN TEMPLATE SWITCHING IN THE DEVELOPMENT AND MODIFICATION OF WEB PAGES

TECHNICAL FIELD

Embodiments of the present invention relate to systems and methods for author-driven template switching in the development and modification of web pages.

BACKGROUND

The Internet, Extranets, and similar networking or communications environments offer users a tremendously flexible and dynamic environment in which to create and disseminate information in the form of Web pages. A number of tools have been developed over time to aid users in the authoring and publishing of Web pages. These authoring and publishing tools often include a variety of templates with predefined data organization and display definitions. The user can also use these tools to develop their own custom templates.

In use, at the beginning of the development of a Web page, the user can select one of these templates based on the type and style of Web page that is desired. Once the selection has been made, the user then may enter data within a number of pre-defined data fields of the template. Once the content of the page has been entered, the user then uses a renderer associated with the template to format the data for publishing to the Internet. The template and the renderer may be tied to each to ensure the particular look and feel of the Web page. Once the data has been rendered or visualized, the Web page can then be posted to an appropriate server and made available to users of the Internet. It is this posted Web page that includes any active links to other data or other Web pages, and it is this posted Web page to which other pages or sites may include links.

If a user desires to change the look and feel of the data displayed on the page, the entire page must be brought down and redeveloped using a new template and associated renderer. Even if the data contained within the page does not change, the Web page must be taken down and the existing links to the posted page may be broken.

As an example, a corporation may wish to disseminate a press release regarding a new product to be placed on the market. The information in such a press release may be picked up by one of the news services on the Internet and republished further in a variety of formats for different audiences. The content of the press release does not change but the style and layout may change, based on the audience for which the format is intended. One version may be published on a financial news section of the news service and may be directed to users who will be most interested in potential revenues or development costs of the new product. Another version may be published in a technical subject matter section where the users are more interested in specific features and capabilities of the product. Yet another version may be published in a general news area where users may be more interested in the name and general character of the product. Each of these pages in different sections of the news service site may have a different variety of links or other information arrayed with the product information, which may be independent of or unrelated to the specific content of the press release.

With the current authoring and publishing tools available, each of these different versions of the same press release could be developed from the same data using different templates or renderers best suited for the intended audience. However, each time the press release is revisualized the URL of the page would change, breaking any external links from other pages or sites to the press release. Each time the press release is revisualized, the existing page including the press release would be deleted and a new page put up in its place. Any links to the original page would then have to be changed to ensure that they pointed to the newly published page.

The present manner of developing and publishing web pages also requires that the web page must be brought down to edit any of the data or other content included on the page. Any corrections to text within the press release in the example above would require that the page be taken from the web, edited, revisualized and reposted to the web server.

Improvements to templates and renderers for developing and publishing Web pages are desirable.

SUMMARY

The present invention relates generally to a system and method of developing and altering web pages. The system and method permit a web page to be created by selecting a schema based on the type of web page desired. The schema or content type defines parameters and formats for required and optional data fields that may be included in the page. The schema may also have one or more associated templates defining how data will be visually rendered into the web page. Once the user has input data according the schema, a selected template is used to render the data and the web page may be released for publication.

The present invention also generally relates to a computer readable medium having computer-executable instructions for developing a web page using schema with defined content types and associated templates for visually rendering data.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
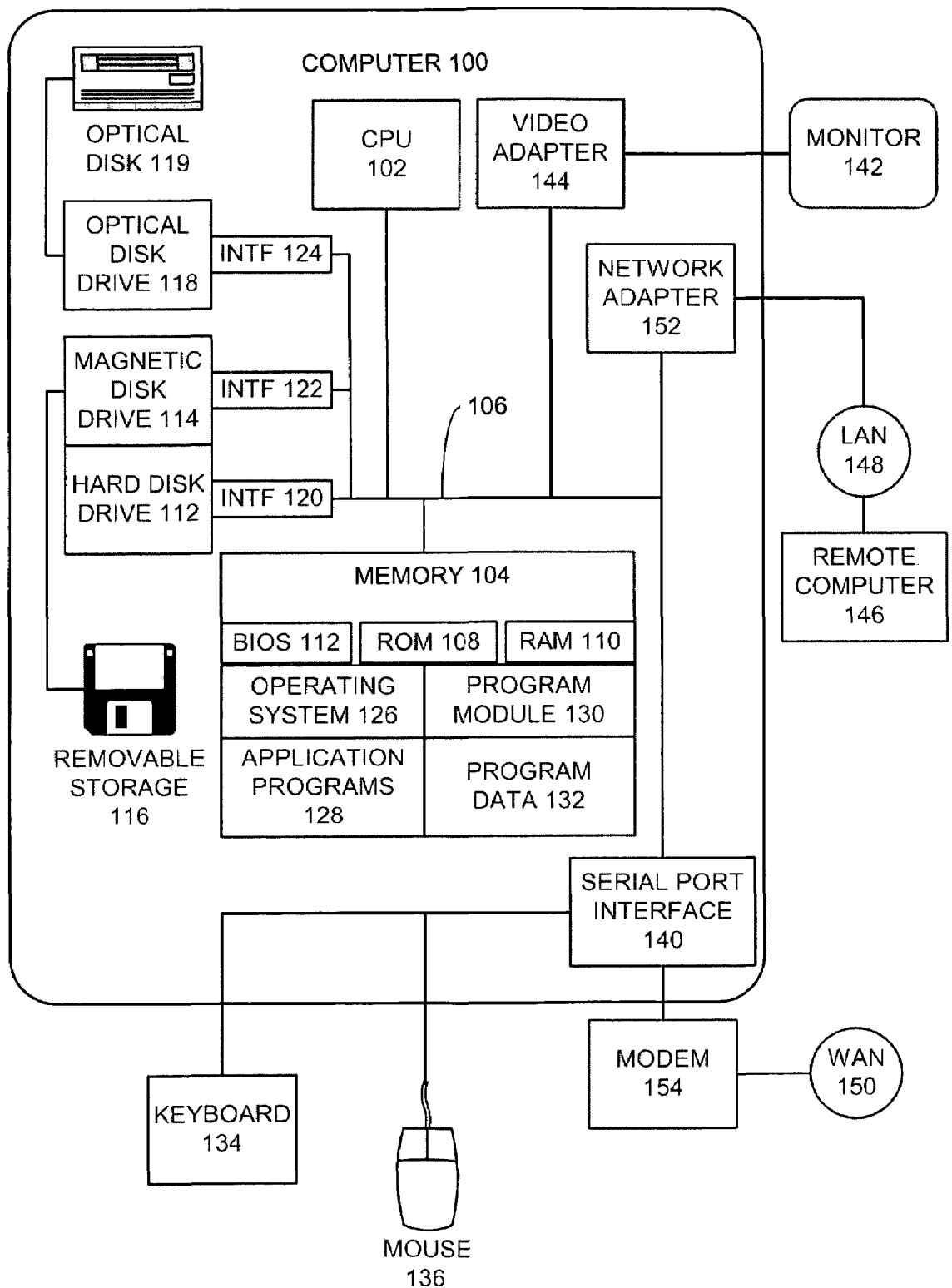
FIG. 1 is an example general purpose computing system according to one embodiment of the present invention.

Referring now to FIG. 1, an example computer system 100 is illustrated. Computer system 100 can take a variety of forms such as, for example, a desktop computer, a laptop computer, and a hand-held computer. In addition, although computer system 100 is illustrated, the systems and methods disclosed herein can be implemented in various alternative computer systems as well.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 2:
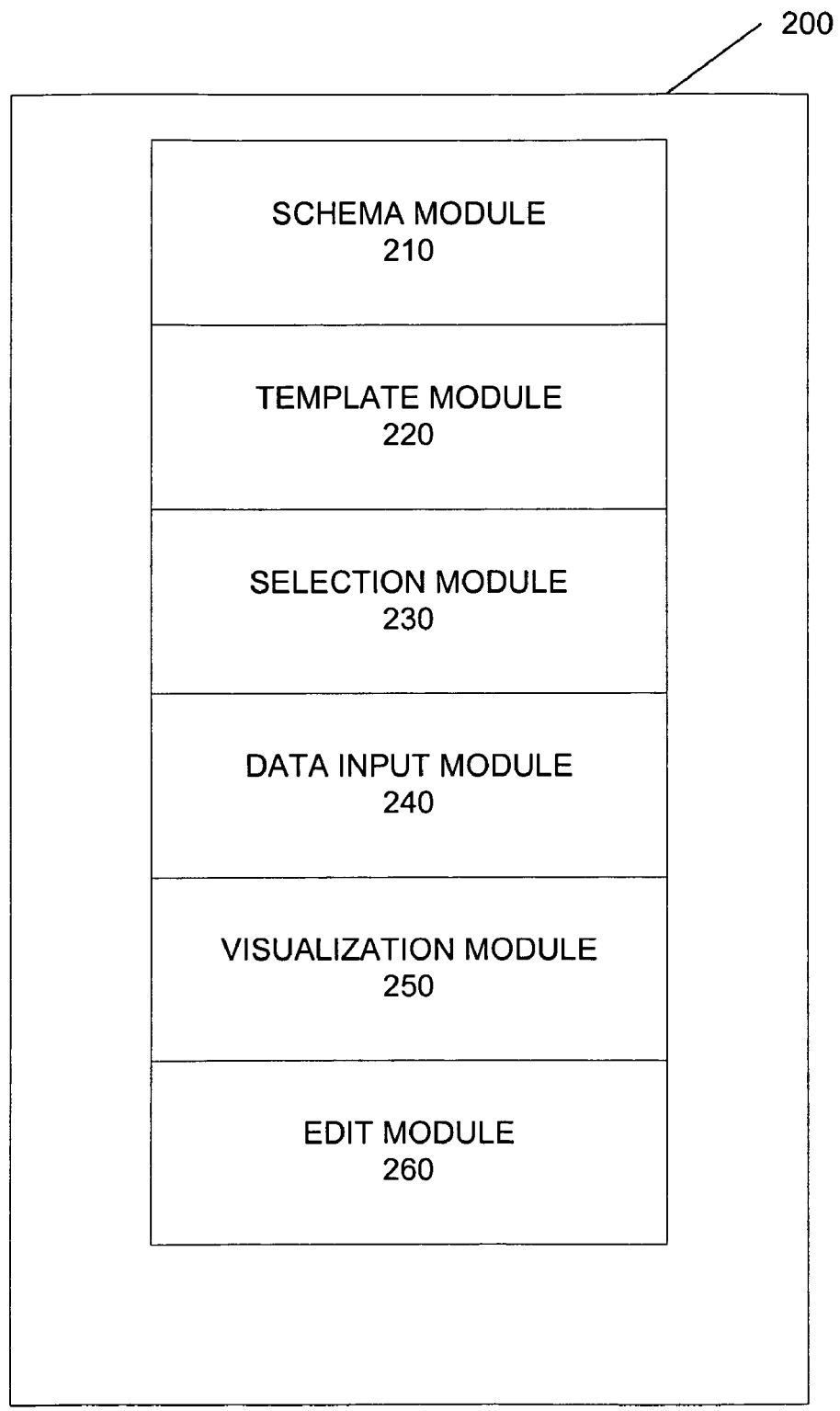
FIG. 2 is a diagram of one embodiment of a computer system including a plurality of modules according to the present invention.

Referring now to FIG. 2, a system 200 with a plurality of modules is illustrated. System 200 provides tools to users wishing to create or author web pages for publication on the Internet, an Extranet, or similar networking or communications environment.

Figure 4:
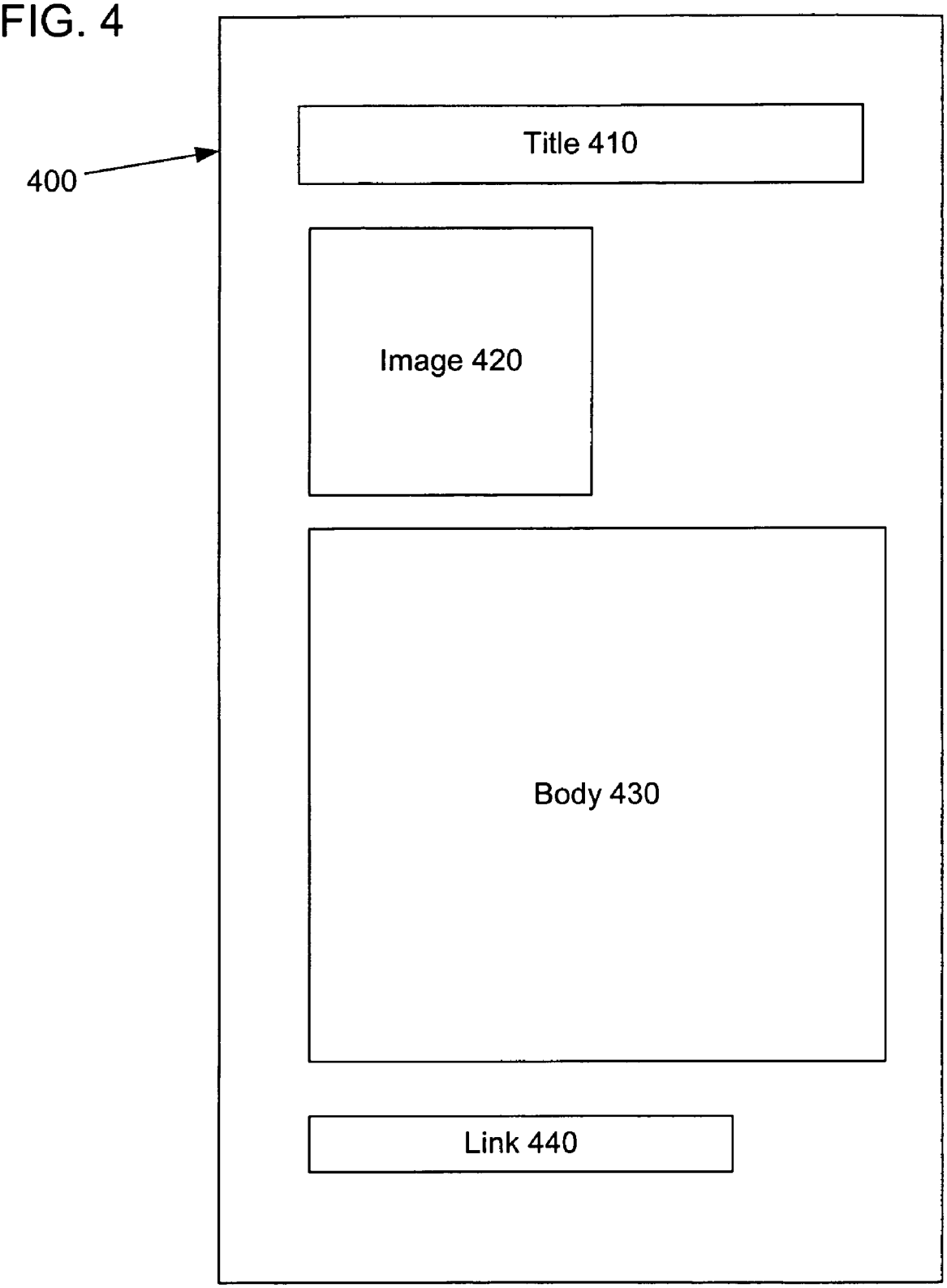
FIG. 4 is a diagram of one embodiment of a schema for a web page according to the present invention.

A schema module 210 provides a location for the storage and maintenance of a plurality of page schema. Each schema defines a particular type of web page, for example, a press release schema 400, as shown in FIG. 4 and described further below. Within the page schema maintained by module 210, one or more required or allowed fields are defined. Each of the required or allowed fields included in a particular schema will have defined a variety of required parameters, such as parameters regarding allowed or required format, maximum or minimum size, and allowed and non-allowed items that may be included. The example press release schema 400 may require that each press release includes a title 410 (which must be text of not less than a certain number of characters and not exceeding a certain number of characters), and a body 430 (which must be text of not less than a certain number of characters and not exceeding a certain number of characters, and may not include any tables). Press release schema 400 may also permit a photograph or other image 420 be included in the press release but may require that any image files included by in JPEG format and between certain upper and lower size limits. Press release schema 400 may also include a link to one or more other locations, such as the web site of an organization referred to in the press release or another web page providing financial reports related to the subject of the press release.

Schema modules may be included within or leveraged by the Microsoft Content Management Server or the Windows SharePoint Services document library, although other implementations are anticipated.

System 200 also includes a template module 220. Each schema, such as press release schema 210, may include a link to a list of one or more templates that may be used to render or visualize any data, which may be input according to the schema. Templates are defined for each schema and define how data entered into one of the required or permitted fields will appear when the data is released for electronic publication. For example, press release schema 400 may have two templates associated with it. One of these templates may be for a short form press release and include only a portion of the data that may be input based on the schema, such as for release and publication in general purpose news outlets. The second press release template may visualize a longer, more detailed press release with more information or links related to the financial history and condition of the organization issuing the press release or to a publication including additional stories related to the organization. Such a press release may be more appropriate for a specialized trade journal or a financial news source.

All templates associates or linked to a particular schema must be able to render any of the data included in the schema. To ensure that a user does not select a template that is incompatible with the selected schema, each schema should include a link to a list of templates capable of rendering the data within the schema. Template module 220 may include all those templates, which are associated with the schema of schema module 210 and may also include additional or sample templates for use with schema, which may be modified or developed in the future. The templates for each schema held by template module 220 may be maintained in the form of an XML list to which a URL included in the schema may point.

System 200 further includes a selection module 230 that allows a user to select a schema from schema module 210 and an associated template for rendering the schema from template module 220. Selection module 230 may be a simple user interface that allows a user to see a list of available schema from module 210 and a list of available templates associated with the schema from module 220. Alternatively, selection module 230 may permit a user to interactively browse the available schema and templates prior to selecting one of each. Selection module 230 may also alternatively include tools permitting a user to modify existing schema and templates or to create new schema and templates.

A data input module 240 allows a user to enter data based on the chosen schema. Within the schema; the required formats of data to be entered in each of the fields are defined. Data input module 240 interprets these content types and provides an interface for the user to enter data for the fields that conforms to the requirements. Data input module 240 may prompt the user as to which fields are required fields and which are optional fields. Data input module 240 may also have an interactive editor that renders the input data using the chosen template to provide the user with a preview of the finished web page.

Once the data has been entered, system 200 includes a visualization module 250 to render the data input using the selected template to create a web page. Web pages generated by visualization module 250 are anticipated to be ready for release to an appropriate server and published or made available over the Internet or other similar desired communications environment.

System 200 includes an edit module 260 that permits a user to edit the appearance of the web page without needing to rebuild the entire web page. By way of example, press release schema 400 may be have been selected along with a long or detailed template. The organization generating the press release may have originally intended that the press release would go out to very specific industry trade publications. However, the organization may determine that the subject matter of the press release has become interesting to a broader segment of the population and wants to reformat the press release to a shorter, more generalized version for release to general news outlets. Instead of recreating an entirely new page by selecting the same schema and a different template and inserting the same data into the content types of the schema, the organization need only define a different template and apply the template to the data already entered in the web page.

This revisualization of existing web pages is supported by defining the allowed fields in the schema and including a link in the schema to those templates that are effective at rendering all of the allowed fields within the selected schema. Essentially, the template selected to render or visualize the data is an attribute of the web page. If the user wishes to change the appearance of the web page to another predefined appearance or form, the template attribute of the web page is changed. The page can then be revisualized and republished or released for publication without having to destroy any of the other data, links or attributes of the page.

Figure 3:
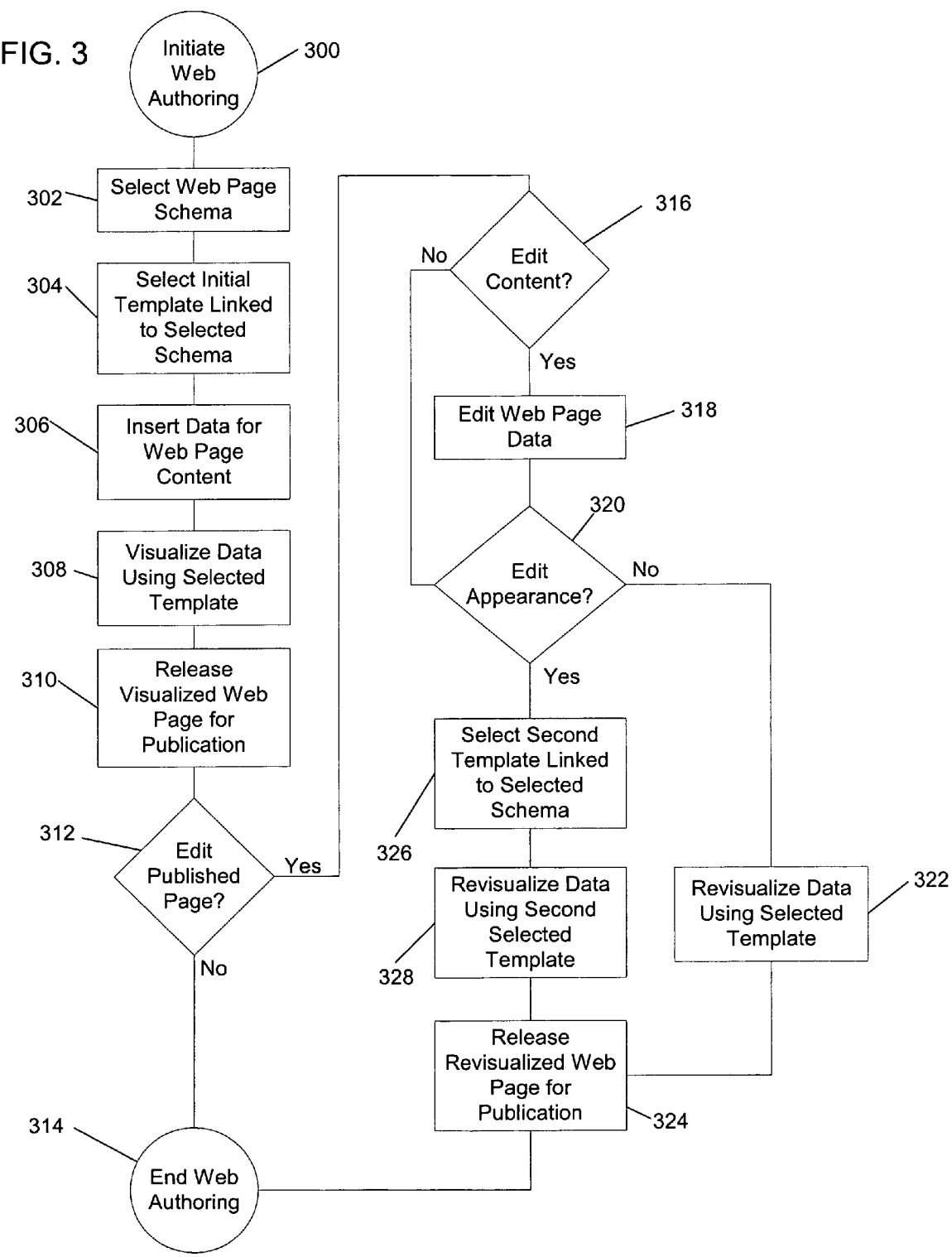
FIG. 3 is a diagram of one embodiment of a process of developing and visualizing a web page according to the present invention.

A method for authoring and editing a web page is illustrated in FIG. 3. In operation 300, web authoring is initiated and a schema is selected for the web page to be developed, such as press release 400, in operation 302. Operation 304 includes the selection of an initial template for rendering the selected schema. Even though this is referred to as the initial template, this may be the only template used for a particular web page, if there are no other templates associated with the schema or if the web page is not altered from its original visual representation.

In operation 306, data is inserted for the required content types of the selected schema. Additionally, data may be inserted into any defined optional content types or fields of the schema. This operation may include use of an editor that interprets the content types of the schema to ensure that appropriate data is entered for the different fields of the schema. Using the press release schema 400 as an example, in this operation, the user may enter a title in title field 410, insert text into body field 430, insert a JPEG into image field 420 and include a link to a company's web site in link field 440. Once this operation is complete, the user may then apply the selected template to the data entered to visualize the web page. Alternatively, operations 306 and 308 may be performed simultaneously or interactively so that the user may see the data entered in the press release format while entering the data.

In operation 310, the visualized web page is released for publication on the Internet, an extranet or similar communication environment. At this point, if no alterations to the rendered and published web page are desired, the user may proceed to operation 314 and end web authoring.

At a later date, the user may decide that the press release needs to be altered to update information in the press release or that additional information needs to be included. Alternatively, upon publishing the web page, the user may determine that an immediate correction or change to the web page is desired. In operation 312, the original creator of the web page or another user may determine that the published web page requires editing. If so, operation 316 queries whether the user wishes to edit or add to the content of any field of the web page. If so, the user then proceeds to operation 318 and makes any desired changes to the fields of the web page, which may include deleting, editing, or adding data.

Upon completion of content editing, or if editing of the content is not necessary or desired, operation 320 queries if the user wishes to edit the appearance of the web page. If the user only wishes to edit the data and retain the original rendering template, the edited data is revisualized or rendered in operation 322 using the initial template. Once the edited data has been rendered, the revisualized web page is released for publication and the web authoring process concludes with operation 314.

Alternatively, in operation 320, the user may choose to edit the appearance of the published web page, such as changing from a detailed press release for a specific industry related trade journal, to a shorter perhaps truncated press release for general interest or non-technical publications. In operation 326, the user selects a second template from the list of templates linked to the selected schema. This new template is then used in operation 328 to revisualize the data. This creates a new web page that may then be released for publication in operation 324 and the authoring process may conclude with operation 314.

Once data within a web page has been rendered and published, the process shown in FIG. 4 does not break any links to or from the data within the web page, unless the data for the link is changed or removed. For example, press release 400 may include a link in link field 440 to the website of the company issuing the press release, and this link will appear in the press release in any press release rendered with any template associated with this schema. Unless the link itself is incorrect and must be amended, the link on the page will be not affected by any later editing or revisualization operations.

Certain editing operations in FIG. 4 may be restricted based on user type or the level of access a user is authorized to have to the web page. Some users, such as the original author, may have full access to all of the operations illustrated in FIG. 4. Other users may be restricted to changing the template and revisualizing the web page without altering the content. Other users may be restricted to editing the content and revisualizing the web page using the template originally selected from the list of templates associated with the selected schema. Some operations, such as operations 320, 326 and 328 may be made interactively available to users accessing the web page so that the users may tailor the web page for different audiences without having the access to the operations to create the web page or alter any content of the web page. Operations 300 to 310 encompass those operations typically associated with the original creation of a web page. Users with access to these operations may be restricted from further alteration of the content of the web page once the page has been approved for content and published.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of authoring a web page comprising:
   receiving a selection of a schema for the web page, the schema defining at least one field, and each field defining a list of required data parameters;
   receiving a selection of a first template from a list of at least two valid templates linked to the selected schema;
   receiving data for insertion into each field of the schema;
   visualizing the data with the template;
   publishing the visualized data as the web page, with the first template defining how the data entered into said fields will appear when published;
   receiving a selection of a second template from the list of valid templates linked to the selected schema;
   revisualizing the published web page without breaking any links pointing to the web page and without creating a new link for the web page; and
   republishing the revisualized web page, where the second template defines how the data entered into said fields will appear when republished, differently from said first template, such that only a portion of the data entered into the schema is revisualized and republished using the second template.

2. The method of claim 1, further comprising editing the published web page prior to revisualizing the published web page.

3. A computing device including a plurality of modules stored on a computer readable storage medium, the computing device comprising:
   a schema module defining a plurality of web page schema, each web page schema defining at least one permitted field;
   a template module defining a plurality of templates, wherein each web page schema is linked to at least me -valid templates, and each template defines how each of the fields within the linked web page schema will be displayed;
   a selection module configured to permit a user to select a web page schema and to select one of the linked templates to visualize the data;
   a data input module configured to permit the user to enter data which conforms to the permitted content types of the selected web page schema;
   a visualization module which applies the selected template to the data to visualize a web page and release the web page for publication;
   an edit module configured to permit the user to edit the published web page through selection of a second template defining- different appearance characteristics for the data of the schema and release the edited web page for publication without creating a new network location link for the edited web page.

4. The computing device of claim 3, further comprising the edit module configured to permit editing of the data of the published web page prior to revisualization.

5. A computer-readable storage medium storing computer-executable instructions for performing steps comprising:
   receiving a selection of a schema for a web page, the schema defining at least one field, and each field defining a list of required data parameters;
   receiving a selection of a template from a list of at least two valid templates linked to the selected schema, the templates defining the appearance characteristics of data entered into the schema;
   receiving data for insertion into each field of the schema;
   visualizing the data with the template;
   publishing the visualized data as the web page;
   receiving a selection of a second template from the list of valid templates linked to the selected schema;

revisualizing the published web page with the second template without breaking any links pointing to the web page and without creating a new network link for the web page; and republishing the revisualized web page to the same network location such that the page has the same network address and a different appearance defined by the second template, such that only a portion of the data entered into the schema is revisualized and republished using the second template.

6. The computer-readable storage medium of claim 5, further comprising editing the published web page prior to revisualizing the published web page.

* * * * *